United States Patent [19]

Giordani

[11] Patent Number: 5,131,623
[45] Date of Patent: Jul. 21, 1992

[54] ACTUATOR AND ZONE VALVE

[75] Inventor: Attilio G. Giordani, East Greenwich, R.I.

[73] Assignee: Taco, Inc., Cranston, R.I.

[21] Appl. No.: 660,792

[22] Filed: Feb. 25, 1991

[51] Int. Cl.[5] ............................................. F16K 31/04
[52] U.S. Cl. .......................... 251/129.03; 251/129.11; 251/129.12
[58] Field of Search ................... 251/129.12, 129.11, 251/129.03

[56] References Cited

U.S. PATENT DOCUMENTS

| 2,573,177 | 10/1951 | Bohlen . | |
|---|---|---|---|
| 3,176,720 | 12/1962 | Donahue . | |
| 3,284,046 | 6/1966 | Allenbaugh, Jr. . | |
| 3,319,646 | 5/1967 | Smulka | 251/129.11 X |
| 3,411,746 | 6/1966 | Scaramucci . | |
| 3,458,172 | 5/1966 | Burrows . | |
| 3,460,803 | 8/1969 | Scaramucci . | |
| 3,472,270 | 10/1967 | Masheder . | |
| 3,522,930 | 5/1968 | Richards et al. . | |
| 4,126,295 | 11/1978 | Nataliza . | |
| 4,203,573 | 5/1980 | Boss | 251/129.11 |
| 4,235,418 | 11/1980 | Nataliza . | |
| 4,247,079 | 1/1981 | Friess . | |
| 4,386,756 | 6/1983 | Muchow . | |
| 4,479,459 | 10/1984 | Piper | 251/129.12 X |
| 4,587,990 | 5/1986 | Pennell et al. . | |
| 4,602,762 | 7/1986 | Koch et al. . | |
| 4,605,202 | 8/1986 | Tsuno et al. . | |
| 4,750,708 | 6/1988 | Yusko, Jr. et al. . | |

FOREIGN PATENT DOCUMENTS 0401443 6/1989 European Pat. Off. .

OTHER PUBLICATIONS

Product literature from Jamesbury (1 page), Watts Regulator (7 pages), Erie (1 page), and Honeywell (1 page).

Primary Examiner—Arnold Rosenthal
Attorney, Agent, or Firm—Fish & Richardson

[57] ABSTRACT

A zone valve for a hydronic system (either heating or cooling) in which a motor-driven actuator rotates a ball valve through approximately 90°, between closed and opened positions. The ball valve provides lower flow resistance than that of conventional heat-motor and motorized zone valves, allowing the use of lower rated pumps, and allowing a single size valve to serve most applications. A restoring torque is provided by a tension spring so configured that it provides sufficient restoring torque to overcome the frictional torque of the ball valve. The restoring torque is kept from building up during rotation by configuring the spring in such a manner that its force varies inversely with the effective moment arm. The restoring torque varies by no more than 20% (preferably no more than 10%) during rotation of the ball valve. This assures that enough torque is always available to restore the valve to its closed (or open, in a normally open case) position, after the motor is de-energized, but that there is not too much torque for the motor to overcome when it moves the valve into the open position.

9 Claims, 5 Drawing Sheets

ACTUATOR AND ZONE VALVE

BACKGROUND OF THE INVENTION

The invention relates to actuators and zone valves for heating systems.

Zone valves are often utilized in hydronic heating and cooling systems. The zone valves isolate specific areas or "zones" of the system. Typically, each zone valve is controlled by a thermostat, which causes the valve to open and close to achieve desired temperature changes.

Conventional zone valves are typically actuated by either a heat motor or an electric motor. In valves with a heat motor as the actuator, an electrically heated element causes linear movement of an actuating element that, in turn, opens the valve. In valves with electric motors, the motor and associated gears rotate an arm within the valve. As the arm rotates, a rubber plunger at its end moves away from a seat, allowing liquid to flow around the plunger. The arm is rotated through an angle of only 20° to 30°, leaving the plunger in the path of the flowing liquid.

SUMMARY OF THE INVENTION

In general the invention features a zone valve for a hydronic system (either heating or cooling) in which a motor-driven actuator rotates a ball valve through about a 90° rotation, between closed and opened positions. The ball valve provides lower flow resistance than that of conventional heat-motor and motorized zone valves, allowing the use of lower rated pumps, and allowing a single size valve to serve most applications. The actuator mechanism is reliable, and by using a ball valve any difficulties associated with wear of the rubber plungers in conventional motorized zone valves are avoided. In preferred embodiments, a restoring torque is provided by a tension spring so configured that it provides sufficient restoring torque to overcome the frictional torque of the ball valve. The restoring torque is kept from building up during rotation by configuring the spring in such a manner that its force varies inversely with the effective moment arm. Preferably, the restoring torque varies by no more than 20% (more preferably, no more than 10%) during rotation of the ball valve. This assures that enough torque is always available to restore the valve to its closed (or open, in a normally open case) position, after the motor is de-energized, but that there is not too much torque for the motor to overcome when it moves the valve into the open position. Without such constancy of torque, a larger (and thus more expensive) motor may be required.

In preferred embodiments, there is a manually-operated lever arm coupled to the stem (or shaft) of the ball valve. By connecting the lever arm directly to the stem of the ball valve, rather than to a shaft within the actuator mechanism, the lever arm can be used to manually open and close the ball valve when the actuator mechanism has been removed (e.g., for repair).

In another aspect, the invention features providing that inverse relationship between the restoring force of the tension spring and the effective moment arm by using a torque transfer segment and a hinge member rotating at the distal end of the segment. The hinge member permits the rate at which the spring is extended to more closely match the rate at which the effective moment arm decreases, to thereby reduce the variation in restoring torque. In preferred embodiments, the invention is incorporated in a motorized zone valve or a motorized flue damper.

In a further aspect, the invention features a disengagement mechanism for a motorized heating system valve. A motor and gear elements provide the driving torque to move the valve from, e.g., a closed position to an open position. During movement of the valve, the gear elements engage a torque transfer segment coupled to the shaft of the valve. A spring provides a restoring torque to the torque transfer segment. After the valve has returned to the closed position, the motor is disengaged from the rest of the drive mechanism to assure that it does not come to an abrupt stop.

In preferred embodiments, the gear elements comprise a gear pinion and a gear segment, and the gear segment rotates freely on the same axis as the valve shaft, but is not directly coupled to it (coupling is via the torque transfer segment). The teeth of the gear segment terminate at a location on the periphery of the segment so that the gear pinion and gear segment may disengage during the disengagement sequence. An engagement member (e.g., a spring biasing the gear segment against the gear pinion) is provided to assure that the gear pinion and gear segment reengage following cessation of motor rotation. To further assure that the motor is permitted to slow down without harm to its internal gear mechanism, there is a period, prior to disengagement of the gear pinion and gear segment, in which the motor, gear pinion, and gear segment rotate free of the valve shaft. This initial disengagement period occurs after the valve has been closed, and the gear segment has become disengaged from the torque transfer segment.

These and other features and advantages of the invention will be apparent from the following description of a presently preferred embodiment and from the claims.

DETAILED DESCRIPTION OF THE PREFERRED EMBODIMENT

Figure 1:
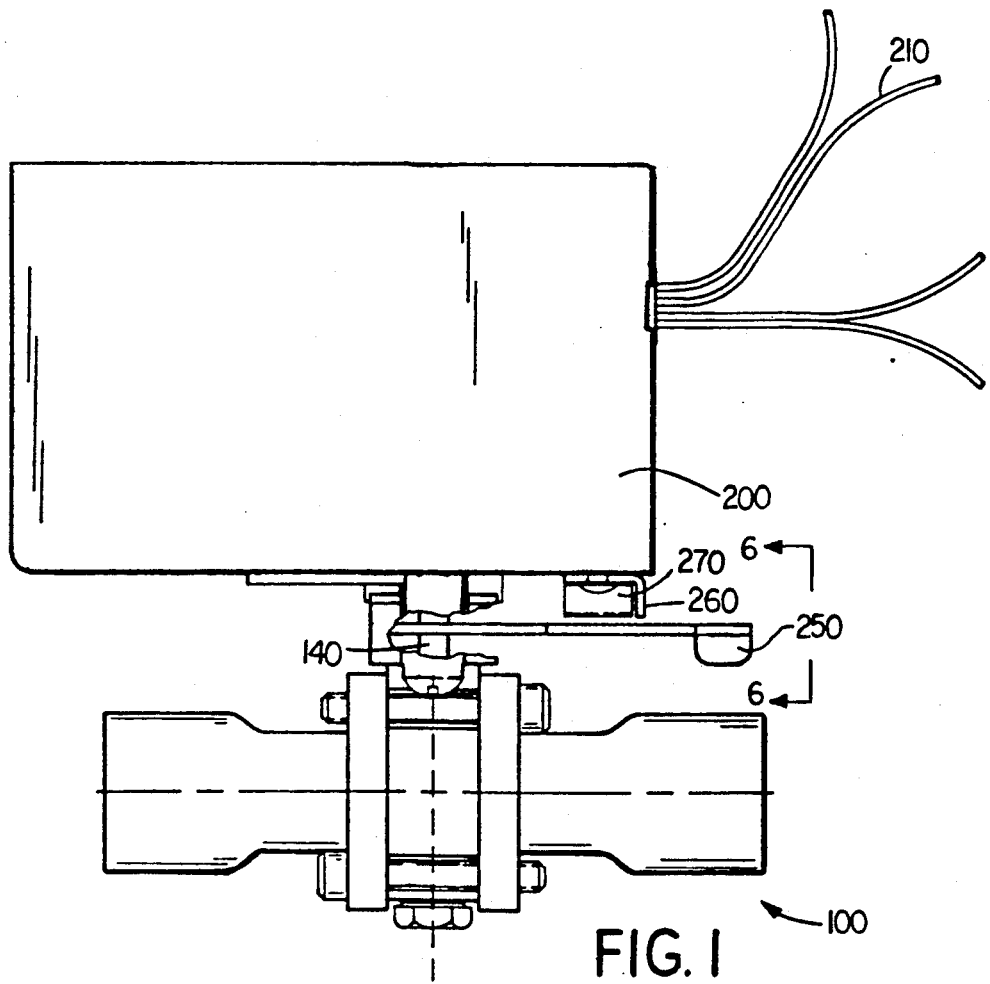
FIG. 1 shows a side view of the actuator mechanism and ball valve of the preferred embodiment.
Figure 2:
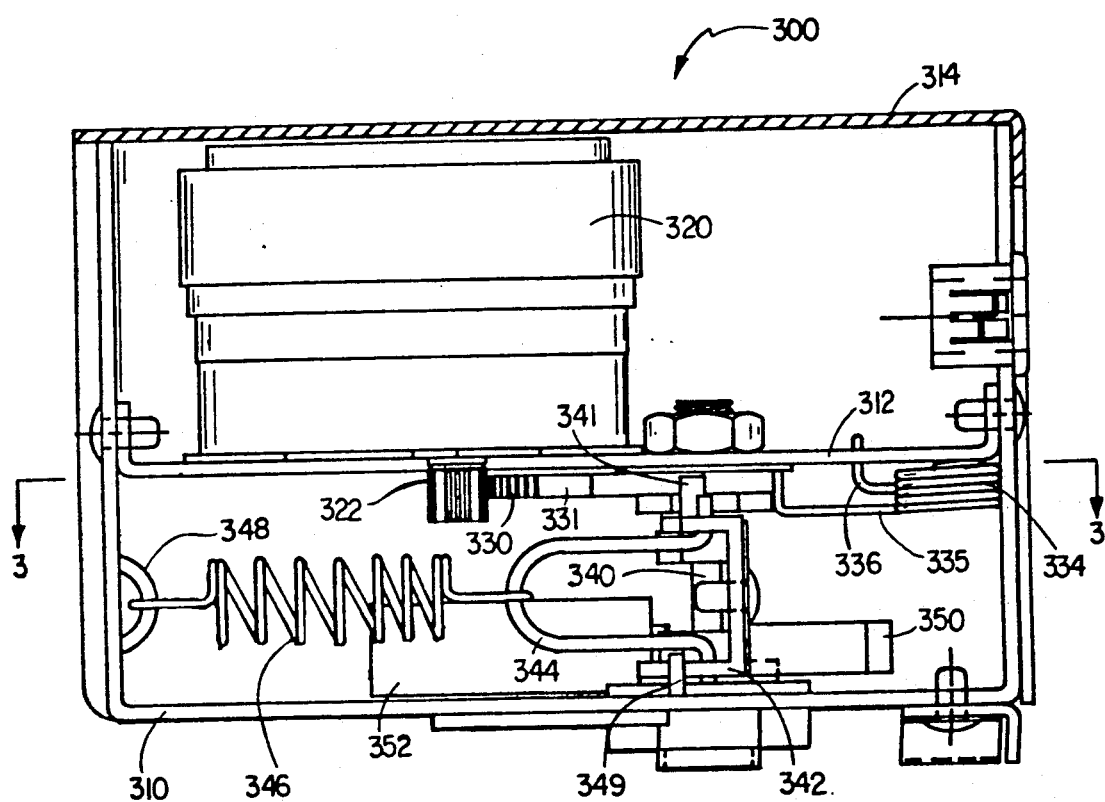
FIG. 2 shows a cross-sectional side view of the actuator mechanism of the preferred embodiment.
Figure 4:
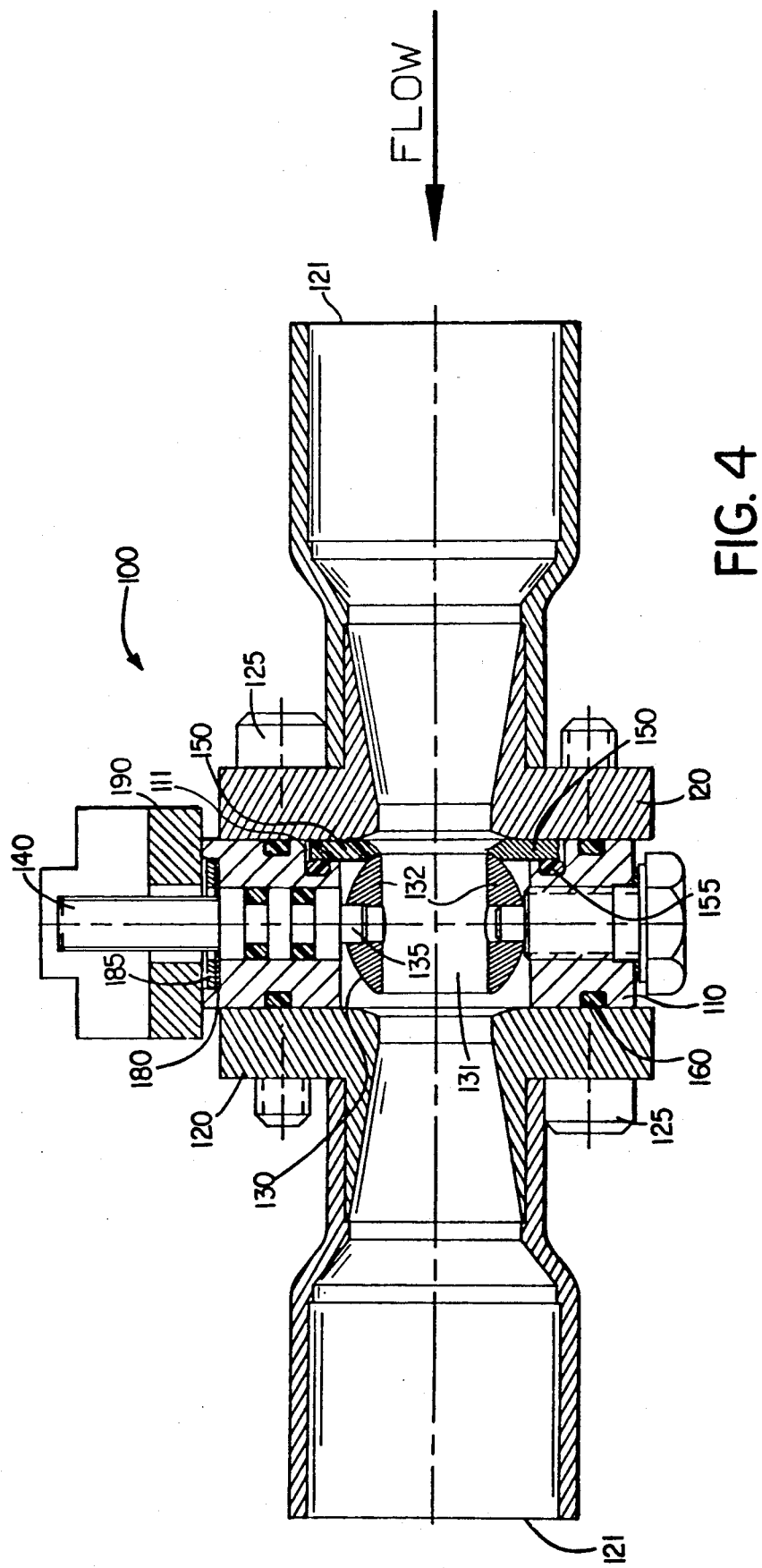
FIG. 4 shows a cross-sectional side view of the ball valve of the preferred embodiment.

FIGS. 1, 2, and 4 show the zone valve of the preferred embodiment. Ball valve 100 is driven by actuator 200. The actuator is coupled to stem 140 of the ball valve, enabling rotation of the ball 130, to either close or open the valve. The actuator is electrically operated, and has wires 210 for coupling it to conventional power and control circuitry.

Figure 6A:
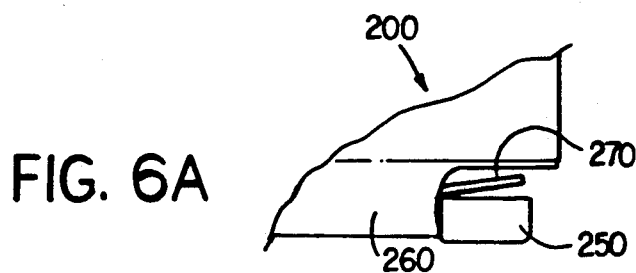
FIGS. 6A and 6B are side views of the manual lever arm and catch, taken along 6—6 in FIG. 1.
Figure 6B:
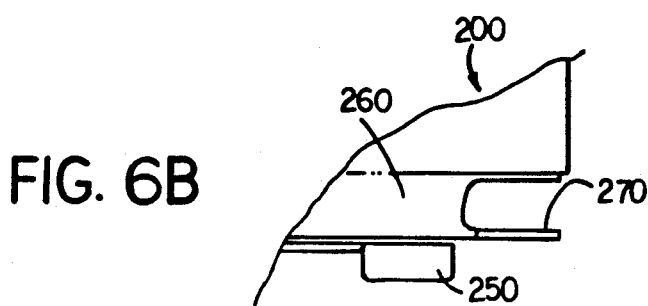

As shown in FIGS. 1, 6A, and 6B, the zone valve has a manually-operated lever arm 250, coupled directly to valve stem 140, to permit manual opening of the valve. FIG. 1 is broken away in the area in which the arm is coupled to the valve stem. The lever arm provides a way of opening the zone valve when the actuator mechanism is inoperable, for example, during a power outage. By coupling the arm directly to the stem, rather than to the actuator mechanism, the lever arm remains on the valve when the actuator mechanism is removed, thus allowing manual operation of the ball valve even when the actuator mechanism has been removed for repair. When the operator rotates the lever arm into the valve-open position, a catch 260 on the under side of the housing holds the arm in that position. A cantilever spring 270 assists in releasing the lever arm when the actuator resumes proper operation. The lever arm is shown positioned in the catch in FIG. 6A, and approaching the catch in FIG. 6B.

FIG. 2 shows the elements of the actuator, in cross-sectional side view. A sheet metal housing is provided, consisting of U-shaped base frame 310, support shelf 312, and cover 314. A synchronous gear motor 320 is mounted on top of support shelf 312. The motor 320 includes a motor gear pinion 322 which protrudes through to the underside of the support shelf. The gear pinion 322 is configured to engage with gear segment 330. The gear segment is mounted so that it rotates freely relative to a shaft 340. Bushings in shelf 312 and base 310 support the shaft 340 and the gear segment 330. A torque transfer segment 342 is fixed to shaft 340. The transfer segment includes an abutment surface 341 so positioned that it abuts gear segment 330 at drive surface 331.

A U-shaped hinge member 344 (contructed of wire) is attached to the end of the torque transfer segment distal from shaft 340. The hinge member 344 is free to pivot about an axis parallel to, but distal from, the axis of shaft 340.

A tension spring 346 is attached at one end to a spring anchor 348 on the wall of the base frame 310, and at the other end to the free end of hinge member 344. The spring 346 biases the torque transfer segment against a stop 349 (formed by bending a tab upwardly from the sheet metal housing) when the zone valve is closed, and against gear segment 330 when the valve is open. The spring has a K-factor of 5.5 in/lb, a preload of 1.0 lb, an unextended length of 1.38 inches, and installed deflections of 0.26 inches at the valve-closed position and 1.19 inches at the valve-open position.

A coil spring 334 is attached to the underside of the support shelf 312. One end of the coil spring forms an arm 335 for engaging the gear segment 330. The arm functions to maintain engagement of the initial tooth of gear segment 330 with pinion 332 when the valve is in a closed position. The other end 336 of the coil spring provides a stop surface for torque transfer segment 342, to prevent it from rotating past an approximately 90° rotation about the shaft 340 (an alternative way of providing this stop, and one that is presently preferred, is to provide a sheet metal tab similar to stop 349).

A switch 352 is mounted on the bottom side of the base frame 310. The switch is actuated by an arm 350 attached to the torque transfer segment 342. Arm 350 activates switch 352 when the zone valve reaches the open position (when the transfer segment has rotated approximately 90° abuts stop 336). The switch functions in a conventional manner, to indicate to the furnace control circuit that the zone valve is open.

Figure 3A:
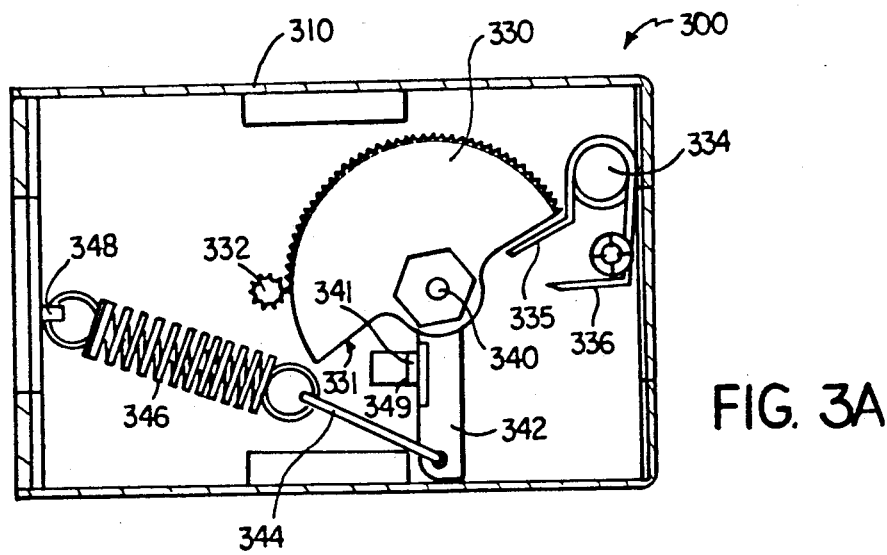
FIGS. 3A—3C show functional states of the actuator mechanism taken along 3—3 of FIG. 2.
Figure 3B:
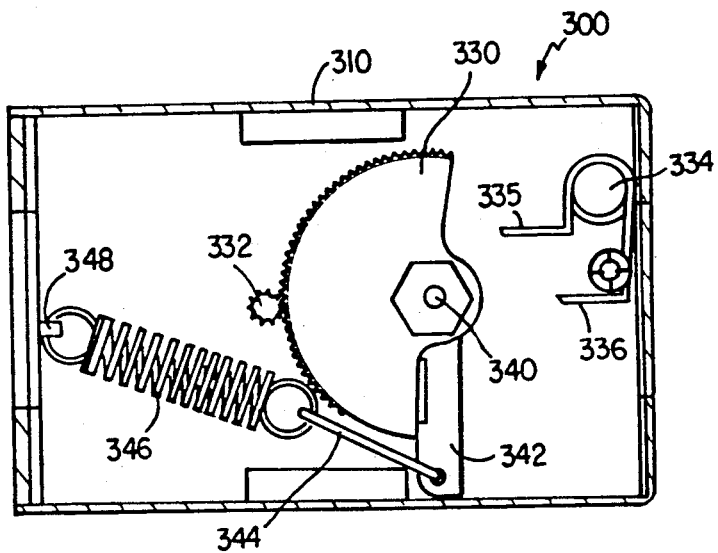
Figure 3C:
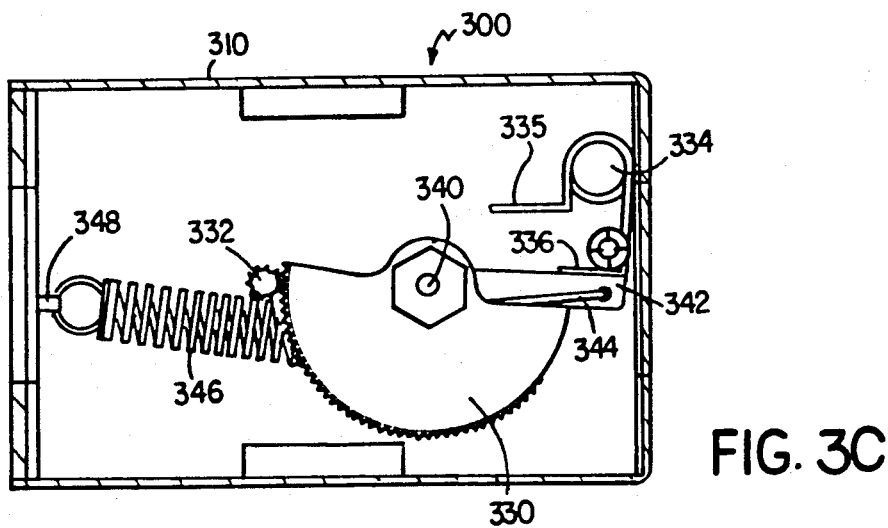

Operation of the actuator 300 is illustrated in FIGS. 3A-3C. In FIG. 3A, the actuator is in a rest or non-actuated state, corresponding to the zone valve being closed. In this position, gear segment 330 is biased by arm 335 of the coil spring 334 so that the initial tooth of the gear segment 330 is in contact with the gear pinion 332. Tension spring 346 works in conjunction with hinge member 344 and transfer segment 342 to bias the torque transfer segment 342 against stop 349.

In FIG. 3B, the valve is still in its fully closed position, but the actuator has begun the sequence of operations that open the valve. Motor 320 has rotated gear pinion 332 and, in turn, gear segment 330 to a position at which drive surface 331 has just come into contact with abutment surface 341 of the torque transfer segment 342. As the motor causes gear segment 330 to rotate further, tension spring 346 applies a restoring torque via hinge member 344 and transfer segment 342. This restoring torque remains approximately constant throughout the roughly 90 degrees of rotation (as discussed below).

In FIG. 3C, the valve is in a fully open position, and gear segment 330 and transfer segment 342 have together rotated through about about 90° relative to their positions in FIG. 3B. Further motion has been stopped by transfer segment coming into contact with stop 336. Electrical current is still being provided to motor 320, but it has stalled and will not rotate further. In this position, tension spring 346 has reached its maximum extension.

As long as the thermostat continues to call for the zone valve to remain open, the motor remains in a stalled condition providing torque to resist that provided by spring 346. When the thermostat calls for the zone valve to close, electrical current to the motor is switched off, and the motor no longer provides a forward-driving torque. thereby initiating the return cycle (see discussion below).

The restoring torque provided by the tension spring is kept approximately uniform throughout the roughly 90 degree rotation of the transfer segment, so that enough torque is always available to close the valve without allowing the torque to build up to a level beyond the capability of the motor. As the torque transfer segment 342 and hinge 344 rotate about shaft 340, tension spring 346 is stretched and the force it applies increases linearly with its extension. Torque, of course, is the product of force times the effective moment arm. Torque is kept approximately constant by configuring the tension spring, hinge member, and transfer segment, so that the moment arm varies inversely with the spring force.

Figure 7:
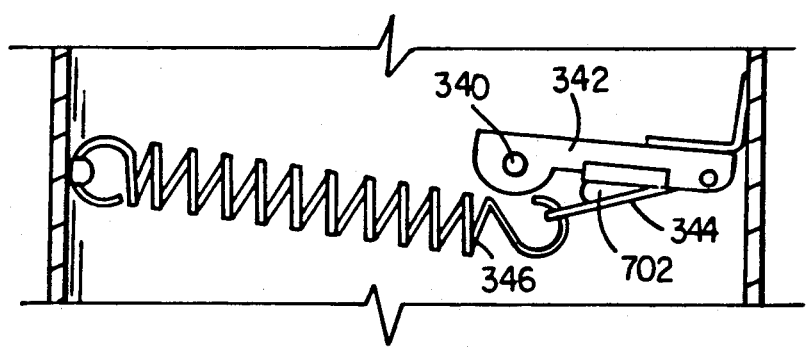
FIG. 7 is a plan view showing a portion of the actuator mechanism.

To make certain that enough restoring torque is provided at the valve-open position, the moment arm is not allowed to become too small. As shown in FIG. 7, which shows the position of the spring 346, hinge member 344, and torque transfer segment 342 at the valve-open position, the torque transfer segment has an integral ramped portion 702 that abuts hinge member 344 in this position to maintain a sufficient moment arm. Without the ramped portion, the hinge member 344 would swing closer to the axis of shaft 340.

In the preferred embodiment, the moment arm decreases approximately in proportion to the increase in length of the tension spring. In the valve-closed position, the spring exerts a force of about 2.45 lb or 39 ounces, and the effective moment arm (the radial line intersecting the spring force vector at 90 degrees) is about 1.0 inches. Thus, the restoring torque is about 39 inch-ounces at the valve-closed position. At the valve-open position, the tension spring force has climbed to about 7.5 lb or 120 ounces, but the effective moment arm has been reduced from 1.0 inches to only 0.32 inches (ramped portion 702 maintaining this minimum moment arm; see FIG. 7), leaving the restoring torque at about 38 inch-ounces, little changed from its value at the valve-closed position. Some variation in the restoring torque occurs between the two positions, but the variation is very small. Preferably the variation is kept less than 20%, and most preferably less than 10%.

Although operation of the valve has been discussed assuming that the valve is actuated from closed to open positions, it will be appreciated that it may be desirable to operate in the reverse direction, with the ball valve set in a normally open position. In this case, the ball 130 would move from an open to a closed position during the actuation process shown in FIGS. 3A-3C.

If the valve has been manually set in an open position using the manual actuator lever arm 250, the lever arm is kicked free of catch 260 (FIGS. 6A and 6B) by tension spring 270 when the torque transfer segment is rotated to the 90° position shown in FIG. 3C. This occurs because the lever arm 250 is rotated further than the catch 260 when the transfer segment has reached the full 90° position, thus allowing the cantilever spring 270 to pop the lever arm downward out of the way of catch 260.

The return cycle of the actuator mechanism 300 is initiated once the electrical power supplied to the motor 320 is terminated by the thermostat. The fully extended spring 346 provides a restoring torque to the torque transfer segment 342 in order to rotate the transfer segment back to the at rest position of FIG. 3A and 3B. As the torque transfer segment 342 rotates back to the at rest position, the abutment member 341 forces the gear segment 330 to rotate in a clockwise manner, and further forces a reversal of the rotational motion of the gear pinion 332 of the now de-energized motor 320. The force provided by the spring 346 effectively produces a reverse rotational speed of up to about 3,000 rpm of the motor 320, which is typically rated for operation only up to 1500 rpm. The motor, itself, provides a resisting torque, as it effectively operates as a generator during the return cycle. When the torque transfer segment 342 reaches the at rest position against the stop member 349 as shown in FIG. 3B, the gear segment 330, being free to rotate relative to the torque transfer segment, continues to rotate, along with the gear pinion and the motor, allowing the motor to decelerate. The gear segment 330 rotates until it disengages from the gear pinion 332, after which the motor is allowed to continue to decelerate in a free wheel manner until winding down to a stop. By disengaging the gear segment 330 from the gear pinion 332, a sudden stoppage of the gear pinion 332 is avoided, thereby avoiding likely damage to the internal gears of the motor 320. After the gear segment 330 is disengaged from the gear pinion 332, and while the gear pinion 332 winds down, the arm 335 of the coil spring 334 contacts the gear segment 330 and provides a return force to re-engage the gear segment 330 to the gear pinion 332. This leaves the gear pinion 332 and the gear segment 330 engaged, ready for the next working cycle of the motor 320.

The actuator is preferably used with the ball valve 100 shown in cross-sectional side view in FIG. 4, to form a zone valve for a hydronic heating or cooling system. The preferred ball valve 100 is a quarter turn, double trunnion, single seat ball valve. The ball valve has a valve body 110 which is disposed between two flange assemblies 120, and held together by body screws 125. The three-piece design allows for the ball valve 100 to be disassembled and reassembled without removing it from the pipeline into which the ball valve 100 is installed.

The valve body 110 supports a ball 130 having a channel 131 therethrough. The ball 130 may be rotated into an open or closed position by the rotation of a stem 140. The ball valve 100 may be converted from a normally open to a normally closed valve by virtue of a connection of the stem 140 to an actuator mechanism (not shown) in either a ball open or ball closed position. The ball 130 and ball channel 131 provide for fluid flow when the ball valve 100 is in the open position, i.e., when the ball channel 131 is aligned with flange channels 121. The ball channel 131 is configured so as to offer minimal resistance to the flow of fluid when the ball 130 is fully opened. The ball 130 also includes smaller through holes 132 which serve as trunnion segments at right angles to the ball channel 131. The smaller through holes 132 are provided for the engagement of the trunnion segments of the stem 140 and a trunnion screw 145. The resulting trunnion surfaces act as bearing surfaces to control the motion of the ball 130 around an axis defined by the stem 140 and the trunnion screw 145. The ball 130 further includes a rectangular slot 135 at the top side thereof for connection to the stem 140, which has a rectangular drive end 141.

The ball valve 100 also includes a valve seat 150 which is designed to provide a seal between the ball 130 and the flange assembly 120. When the ball 130 is in the closed position, fluid is trapped upon entering the ball valve 100 by the valve seat 150, a seat o-ring 155, the flange assembly 120, and the ball 130. The valve seat 150 is a dynamic seal, made of resilient material suitable for the cyclic rotation of the ball 130 while under mechanical deformation due to being mechanically loaded against the valve assembly 120 by the ball 130. The valve seat 150 is sized to float in a cavity 111 of the valve body 110 so that during assembly of the ball valve 100, the valve seat 150 will be self-centering on the sphere of the ball 130.

The valve body 110 is provided with body o-rings 160 which effect a seal between the valve body 110 and the two flange assemblies 120, thus preventing leakage from the inside of the ball valve 100 to the outside of ball valve 100. The seat o-ring 155 effects a seal between the valve body 110 and the valve seat 150, thus preventing leakage between the valve body 110 and the valve seat 150. The stem 140 may be provided with two stem o-rings 170 which effect a dynamic seal between the stem 140 and the valve body 110.

The stem 140 is further provided with a stem washer 180 having a square broached center hole for attachment to the stem 140. Any thrust up the stem 140 due to fluid pressure or motion of the ball 130, is transmitted through the stem washer 180 to a low coefficient of friction stem washer 185 for transmission of the thrust load to a bonnet plate 190.

Figure 5:
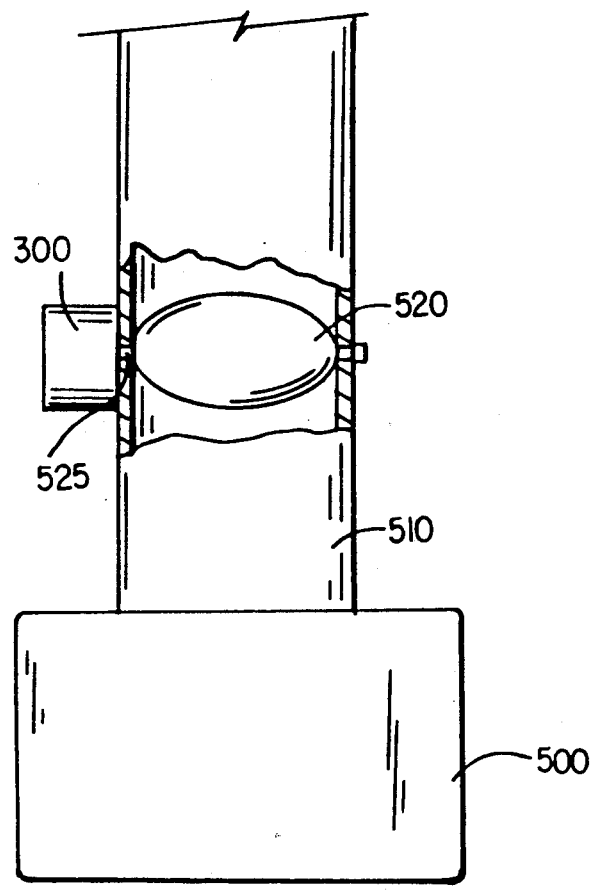
FIG. 5 shows the preferred actuator mechanism utilized in conjunction with a flue damper.

While the actuator mechanism 300 and the ball valve 100 operate together as a zone valve in a preferred embodiment of the present invention, it will be appreciated that the actuator mechanism 300 may be utilized in conjunction with other devices such as a flue damper. With reference to FIG. 5, a furnace 500 is illustrated with an attached flue 510. Inside of the flue 510, is positioned a flue damper 520 which is operable to be opened between an open and closed position. The flue damper 520 is typically rotated about 90° by a damper stem 525.

According to a further embodiment of the present invention, the actuator mechanism 300 as described above, may be attached alongside the flue 510 and operationally connected to the damper stem 525. Therefore, as the actuator mechanism operates in accordance with the description associated with FIGS. 3A-3C, the flue damper 520 may be rotated about 90° between closed and open positions.

Other embodiments of the invention are within the following claims. Valves in which the rotation is less than or more than 90 degrees can benefit from the invention.

I claim:

1. A zone valve assembly for a hydronic system, comprising;
    a valve body with an inlet member and an outlet member;
    a ball valve element disposed within said valve body and in fluid communication with said inlet member and said outlet member; and
    a valve stem connected to said ball valve element, said valve stem, when rotated about 90°, positioning said ball valve between a closed position, in which fluid flow from said inlet member to said outlet member is blocked, and an opened position, in which fluid flow may occur; and
    an actuator mechanism coupled to said valve stem, said actuator mechanism, when activated, moving said ball valve element through a rotation of about 90 degrees from one of said closed and opened positions to the other,
    wherein said actuator mechanism comprises a motor coupled to said valve stem so that electrical energization of said motor rotates said ball valve element through about a 90° rotation, rotating said ball valve element from one of said closed and opened positions to the other of said positions,
    wherein said ball valve element and valve housing are configured so that a frictional torque must be overcome to rotate said ball valve element, and
    wherein said actuator mechanism further comprises a spring element connected so as to provide a restoring torque opposing rotation of said ball valve element by said motor, said restoring torque being sufficient for overcoming said frictional torque and returning said ball valve element to its position prior to motor energization.

2. The zone valve of claim 1, wherein said spring element is configured to provide sufficient restoring torque for overcoming said frictional torque at any rotational position between said opened and closed positions.

3. The zone valve of claim 2, wherein said restoring torque does not vary by more than 20% between said opened and closed positions.

4. The zone valve of claim 2, wherein said spring element is a tension spring, and the product of the force provided by said tension spring and an effective moment arm provide said restoring torque.

5. The zone valve of claim 4, wherein the effective moment arm varies inversely with the force provided by said tension spring over the approximately 90° of rotation, to thereby reduce variation in said restoring torque.

6. The zone valve of claim 5, wherein the variation in restoring torque is less than 20% over the approximately 90° of rotation.

7. The apparatus of claim 3 wherein said variation in torque is less than 10%.

8. The apparatus of claim 6 wherein said variation in torque is less than 10%.

9. A zone valve assembly for a hydronic system, comprising:
    a valve body with an inlet member and an outlet member;
    a ball valve element disposed within said valve body and in fluid communication with said inlet member and said outlet member; and
    a valve stem connected to said ball valve element, said valve stem, when rotated about 90°, positioning said ball valve between a closed position, in which fluid flow from said inlet member to said outlet member is blocked, and an opened position, in which fluid flow may occur; and
    an actuator mechanism coupled to said valve stem, said actuator mechanism, when activated, moving said ball valve element through a rotation of about 90 degrees from one of said closed and opened positions to the other,
    further comprising a manually-operated lever arm coupled to said valve stem and a catch for holding said lever arm in a position corresponding to the open position of said valve, wherein said lever arm can be used to manually open and close said valve when said actuator mechanism is installed on said valve and when said actuator mechanism has been removed from said valve.

* * * * *

UNITED STATES PATENT AND TRADEMARK OFFICE
CERTIFICATE OF CORRECTION

PATENT NO. : 5,131,623

DATED : July 21, 1992

INVENTOR(S) : Attilio G. Giordani and Robert W. Castle

It is certified that error appears in the above-identified patent and that said Letters Patent is hereby corrected as shown below:

On cover page, please add the following to Section [75] Inventor: --and Robert W. Castle, Pawtucket, R.I.--

On cover page, Section [56] References Cited, U.S. PATENT DOCUMENTS, Patent No. 4,126,295, "Nataliza" should be --Natalizia--.

Signed and Sealed this

Twentieth Day of April, 1993

*Attest:*

MICHAEL K. KIRK

*Attesting Officer*     *Acting Commissioner of Patents and Trademarks*